United States Patent [19]

Sobczak et al.

[11] Patent Number: 4,566,432
[45] Date of Patent: Jan. 28, 1986

[54] METHOD FOR MASS PRODUCING SOLAR RADIATION REFLECTERS

[75] Inventors: Isidore F. Sobczak; William C. Cleveland, Jr., both of Santa Ana; Robert L. Pons, Mission Veijo, all of Calif.

[73] Assignee: Ford Aerospace & Communications Corporation, Detroit, Mich.

[21] Appl. No.: 597,789

[22] Filed: Apr. 6, 1984

Related U.S. Application Data

[62] Division of Ser. No. 355,409, Mar. 8, 1982, Pat. No. 4,535,961.

[51] Int. Cl.⁴ .................................................. F24J 3/02
[52] U.S. Cl. ..................................... 126/438; 126/424; 350/613
[58] Field of Search ....................... 126/438, 424, 425; 350/292, 293, 299, 310; 248/481, 486

[56] References Cited

U.S. PATENT DOCUMENTS 811,274  1/1906  Carter .................................. 126/438
4,110,010  8/1978  Hilton ................................. 350/292
4,218,114  8/1980  Bunch ............................. 126/438 X
4,345,582  8/1982  Aharon ............................. 126/424

Primary Examiner—Randall L. Green
Attorney, Agent, or Firm—Edward J. Radlo; Robert D. Sanborn

[57] ABSTRACT

A structure (47) is rotatable 360° about a vertical azimuth axis and 90° or more about an orthogonal elevation axis. The structure (47) is mounted upon a rotating turret (6) in the general shape of an inverted pyramid, with a vertical generally cylindrical torque tube (11) protruding from the bottom of the turret (6). A drive wheel (12) is attached to the bottom of the tube (11) and provides a mechanical advantage for azimuthal rotation because it is larger than the wheel (25, 26, 30) connecting the top of the tube (11) with the bottom of the turret (6). The turret (6) rotatably turns about tripod base (46) by means of wheels (29) mounted beneath the rim (30) of said upper wheel (25, 26, 30). Elevational motion is provided by means of a lead screw (16) connecting rotating turret (6) with structure (47), which can be a modular mass-producible solar radiation reflector consisting of many identical reflective panels (1), each having the shape of a portion of the surface of a sphere.

2 Claims, 7 Drawing Figures

METHOD FOR MASS PRODUCING SOLAR RADIATION REFLECTORS

This is a divisional application of application Ser. No. 355,409, filed Mar. 8, 1982, now U.S. Pat. No. 4,535,961.

DESCRIPTION

TECHNICAL FIELD

This invention pertains to the field of azimuth/elevation mounts for rotating a structure 360° about an azimuth axis and 90° or more about an elevation axis orthogonal to the azimuth axis. The structure to be rotated can be anything requiring this type of mount, e.g., a microwave antenna, telescope, etc.; described in detail herein is a mass-producible point focusing solar reflector for the generation of electrical energy or industrial process heat.

BACKGROUND ART

A prior art search was conducted and disclosed the following references. In general, azimuth/elevation mounts of the prior art use expensive precision bull gears subject to both gravity and overturning loads. The mount of the present invention decouples the paths for gravity and overturning loads. This is accomplished by means of a novel wheeled turret (6), torque tube (11), and mechanically advantageous drive wheel (12).

U.S. Pat. No. 3,713,727 is a point focusing solar concentrator. The reflector has an overall paraboloidal shape as compared with the overall spherical shape of the reflector of the present invention. The individual reflective facets have variable shape and are flat, whereas the facets in the present invention have a uniform size and are shaped as spherical sections. The azimuth/elevation mount shown in the patent uses a turntable with sector and bull gears, whereas the present invention uses a torque tube, drive wheel, chain and sprocket. The base of the concentrator depicted in the patent uses multiple vertical support legs, rather than the tripod frame of the present invention. Unlike the present invention, the patent design has no application to the production of electricity or industrial process heat in large, economic quantities, nor is the concentrator intended for low cost mass production. Rather, it is an assemblage of parts intended as a solar furnace with specialized specimen handling features for isolated laboratory testing of materials.

U.S. Pat. No. 3,977,773 is a point focusing solar concentrator having an overall paraboloidal shape, rather than the overall spherical shape of the reflector of the present invention. The reflective facets are tiny, flat, rectangular tiles, and have variable shapes, whereas the present invention uses uniform sized facets having a spherical contour. The mount of the device described in the patent is a polar mount rather than the azimuth/elevation mount of the present invention.

U.S. Pat. No. 811,274 is a line focusing, rather than a point focusing, device because the overall spherical shape of the reflector combined with the non-Fresnelled contour facets give this type of focus. The present invention, on the other hand, is a point focusing concentrator. The mount in the patent uses a center post on a circular track for azimuth with double lead screws for elevation, whereas the present invention advantageously uses a turret and torque tube for azimuth and a single lead screw for elevation. The use of two lead screws, perhaps mandated by the great weight of this patent's reflector, is unfortunate because of the potential for binding due to unequal travel along the two screws. The base in the patent uses a track and central pintle, whereas the present invention advantageously uses a tripod frame.

U.S. Pat. Nos. 4,129,360; 4,266,530; and 4,284,061 are not point focusing devices, and therefore not directly relevant to the present invention.

"Mirror on the Sun", Jet Propulsion Laboratory, JPL 400-10, October 1980, discloses a solar test bed concentrator with a reflector having an overall paraboloidal shape, not a spherical shape as in the present invention. There are no spaces between panels as in the present invention.

DISCLOSURE OF INVENTION

Described herein is a modular concentrator for solar radiation. The concentrator can be quickly and easily assembled on site; most of the parts are factory assemblable and mass-producible. The reflector (47) of the concentrator has approximately the shape of a portion of a sphere. The reflector (47) consists of many reflective panels (1), each having identical size and the shape of a portion of a sphere. At the focal point of each of the panels (1) is the aperture (36) of a solar radiation receiver (34). The reflective panels (1) are mass produced and pre-assembled into a set of aligned modules (3). The modules (3) are then assembled on site onto the reflector support structure (4) with a minimum of labor. The panels (1) are preferably square in their planar projection. The resulting reflector (47) has a rectangular aperture, with space between panels (1) allowing for the flow therethrough of otherwise deleterious wind.

The reflector (47) is mounted on a rotary turret (6) which contains a single lead screw elevational mount (16) and transfers loads from the reflector (47) to a tripod base (46). A torque tube (11) connects the rotary turret (6) with a large azimuth drive wheel (12), providing a mechanical advantage. The base (46) is easy to install in the field on varying terrains (15) without the necessity for a large foundation as is common for other types of azimuth/elevation mounts.

BRIEF DESCRIPTION OF DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
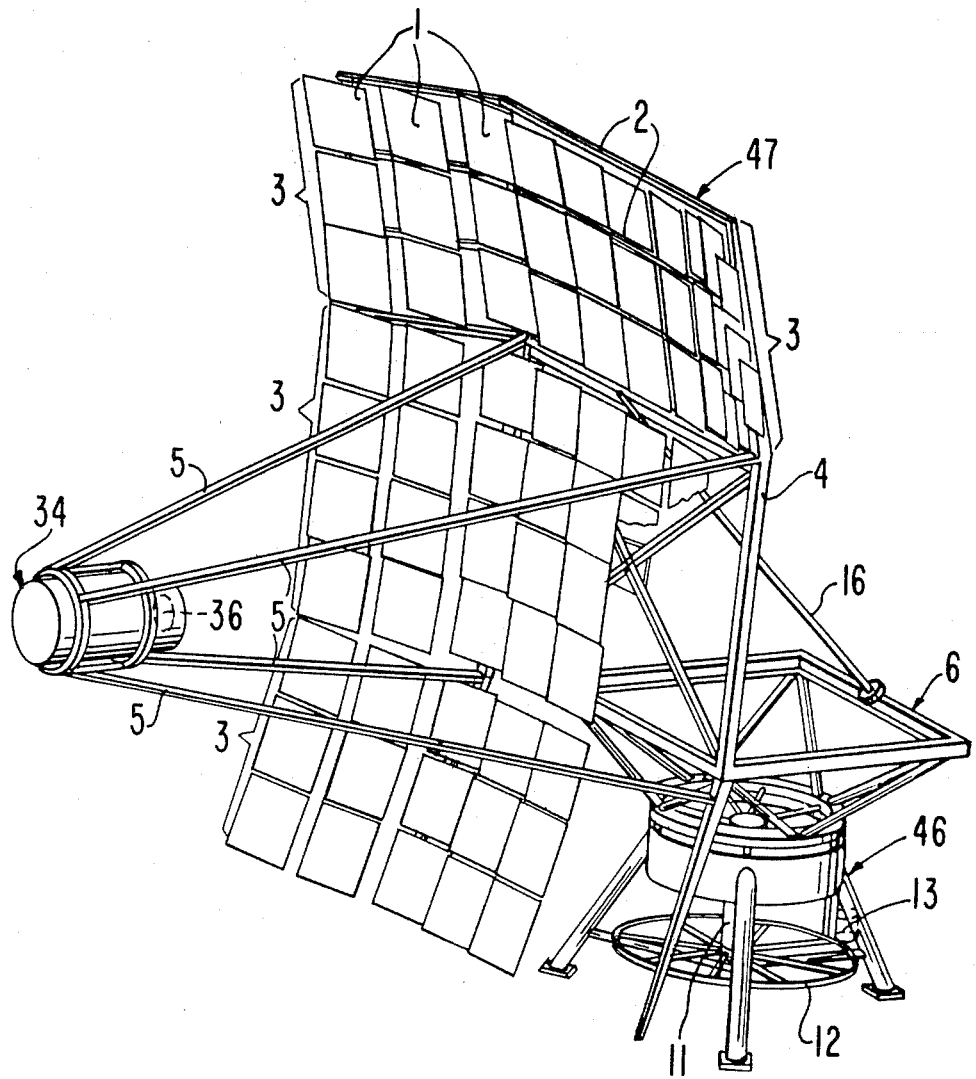
FIG. 1 is an elevational view of the concentrator of the present invention.

FIG. 1 illustrates that the reflector 47 is fabricated by combining a large number of reflective panels 1 having identical size and contoured as a portion of a sphere. Thus, panels 1 can be easily mass produced, unlike the case where paraboloidal reflective surfaces are employed. Each panel 1 can consist of reflective glass mounted on a substrate of metal or plastic.

Normally, a spherical reflector focuses on a line connecting the midpoint of the reflector with its focal point. However, as the size of the reflector becomes small, the reflector's focus approaches a point which is situated one half of the reflector's radius of curvature away from the surface of the reflector. This condition is met here, because a large number of panels 1 are employed, and they have relatively small reflective surfaces compared with their radii of curvature. In the example illustrated in FIG. 1, focal aperture 36 is approximately 300 inches from the surface of each of panels 1, each of which has a radius of curvature of 600 inches. There are 110 panels, each having a surface area of 1.0 square meters. Panels 1 in the lower right of the drawing have been omitted to avoid cluttering.

Since each panel 1 is positioned to be substantially its focal distance from aperture 36 or radiation receiver 34, the overall shape of reflector 47 approximates the surface of a sphere, having a maximum size of a hemisphere. This technique, compared with the case where the reflective surface is paraboloidal, increases the contribution to the focal area from each panel 1 and is therefore an efficient means of summing the contributions from each panel.

The planar projection of each panel 1's focal area is a small ellipse because the sun is a finite source. The size of each focal ellipse beyond the projected sun image is a function of the accuracy with which the panel 1 is aligned, how well it approximates the surface of a sphere, and the position of the panel relative to focal aperture 36. As the size of the panel 1 decreases, its focal area also diminishes, approaching the solar image. The radii of reflector 47 and panels 1 are selected so that most of the radiation reflected by each panel 1 focuses within aperture 36 of receiver 34.

Each panel 1 is mounted between two straight horizontal beams 2 which are positioned equidistant from each other, e.g., by means of diagonal back bracing (not illustrated in the drawings) linking all the beams 2 in a module 3. Only the top four horizontal beams 2 are illustrated in FIG. 1, to avoid cluttering the drawing. For the same reason, the lower right panels 1 and hinges 7 are not shown in FIG. 1. Panels 1 are independently partially pivotable about two orthogonal axes so that after alignment and lockup they each focus on aperture 36.

Each beam 2 is shown bent in two places (where reflector support structure 4 intersects each beam 2), so that overall, reflector 47 will have the desired quasi-spherical shape. The number of bends in reflector 47 is a tradeoff between achieving the conflicting desirable goals of a near spherical shape and ease of manufacture. Normally, there are between two and four vertical bends and between two and four horizontal bends in reflector 47. The reflector 47 illustrated in FIG. 1 has two vertical bends and two horizontal bends. Eleven panels 1 are shown supported between each pair of horizontal beams 2. The vertical bends in support structure 4 define assembly modules 3. The top three rows of panels 1 constitute a first module 3, the middle four rows of panels 1 constitute a second module 3, and the lower three rows of panels 1 constitute a third module 3. The number of rows of panels 1 per module 3 is variable. The center module 3 (if any) should have the greatest number of panels 1 for reasons of structural efficiency. The number of modules 3 can also be varied to take into account solar radiation intensity, wind, and terrain conditions. For example, in windy locations, two modules 3 might be used, each having 4 rows of 11 panels 1.

Figure 4:
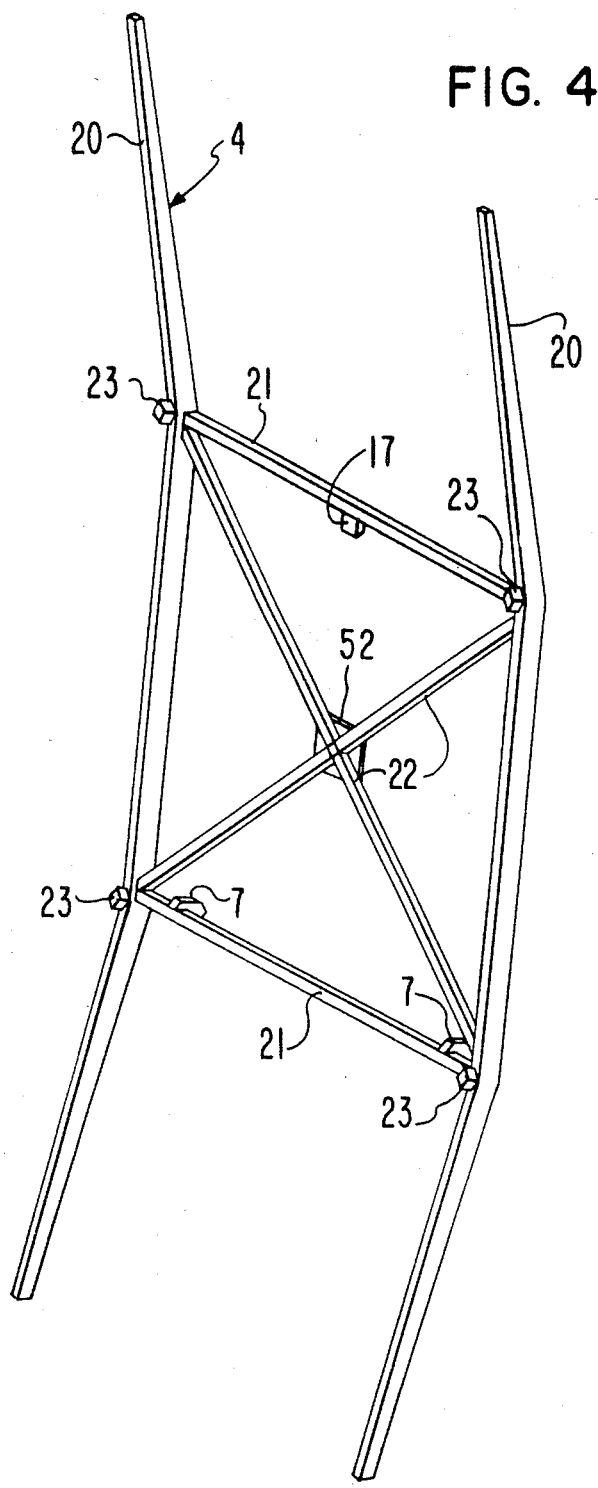
FIG. 4 is an elevational view of the reflector support structure (4)

At the installation site, the prefabricated and prealigned modules 3 are mounted on reflector support structure 4, which consists of two main vertical members 20 and two horizontal members 21 reinforced with diagonal cross-members 22 (see FIG. 4). Radiation receiver support struts 5 connect receiver 34 with the intersection of the vertical and horizontal members 20, 21.

It can be seen from FIG. 1 that open area surrounds each panel 1. This permits the flow of wind through the reflector 47, thereby partially reducing the deleterious effect that wind has on the structural integrity of the concentrator.

The concentrator is mounted on an azimuth/elevation mount consisting of turret 6 and base 46. The change in the elevation axis is accomplished by means of lead screw 16.

Turret 6 rotates azimuthally about the center axis of torque tube 11 protruding from the bottom of turret 6, and is supported by base 46. Motor 13 engages drive wheel 12 to provide rotation about the azimuth axis.

Figure 2:
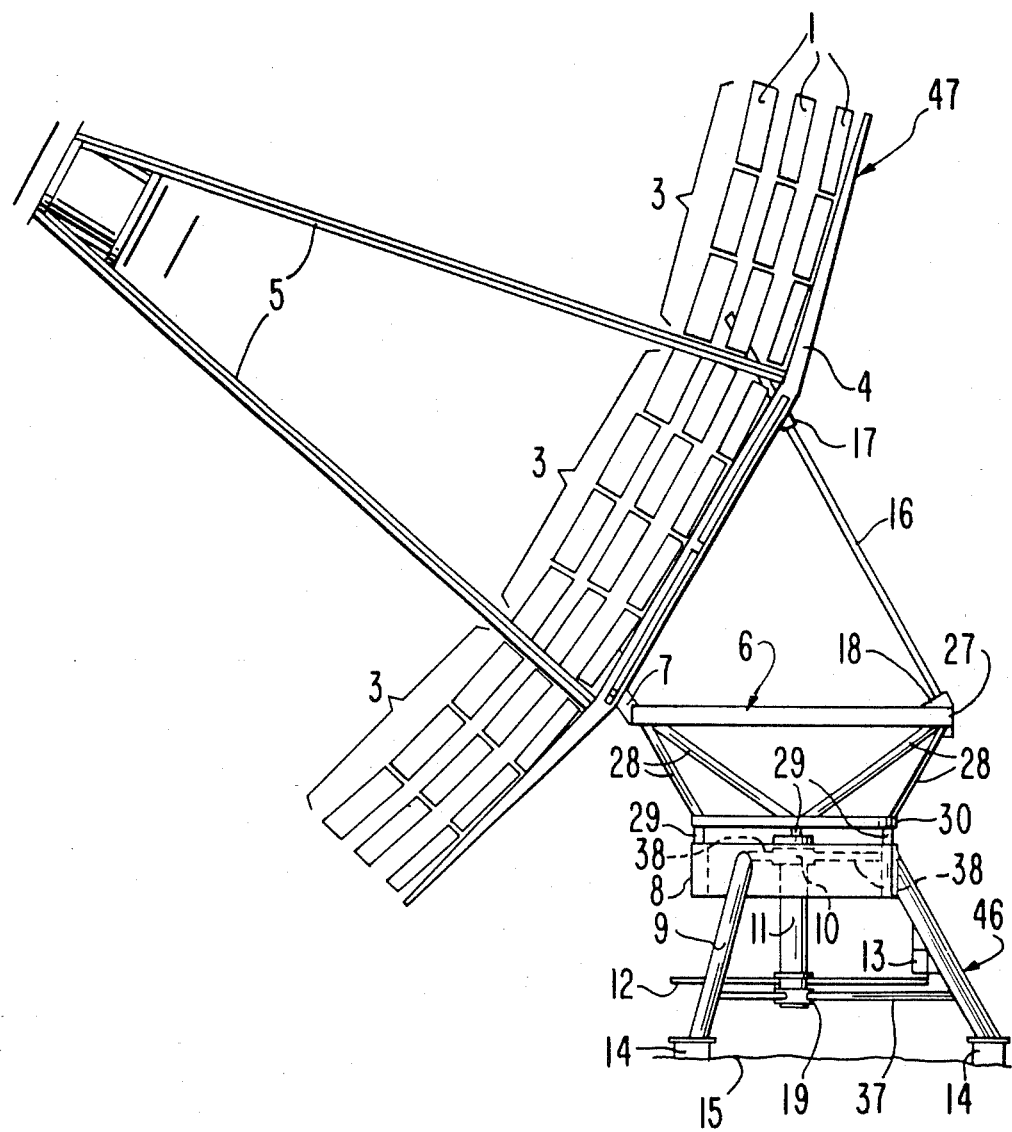
FIG. 2 is a side view of the concentrator of the present invention.

FIG. 2 is a side view of the concentrator showing additional features of the instant invention. Reflector 47 is mounted on rotary turret 6 by means of hinges 7 which connect reflector support structure 4 with one of the upper support members 27 of turret 6. Attached to the support member 27 opposite from that supporting hinges 7 and reflector 47 is an optional counterweight (not illustrated) for balancing the gravitational forces acting upon reflector 47 to bring them evenly through turret 6 and base 46.

Base 46 consists of horizontal platform 8 supporting turret 6 and mounting legs 9 standing on the ground or other mounting surface 15. Upper hub/bearing assembly 10 and lower hub/bearing assembly 19 radially support torque tube 11 and react wind loads and residual gravity unbalances. A large horizontal drive wheel 12 is fastened to the bottom end of torque tube 11. It also provides a mechanical advantage so that turning the reflector 47 azimuthally is made easier.

Electric drive motor and controller 13 is coupled to drive wheel 12 to provide the azimuthal rotation at a rate controlled by an auxiliary sun tracker device (not illustrated) mounted on the concentrator at some convenient position. A suitable means for driving wheel 12 is to fit a linked chain, as a motorcycle drive chain, tightly around the periphery of wheel 12. This chain is engaged by a sprocket gear driven by motor 13. Alternatively, a standard drive belt arrangement could be utilized.

A foundation consisting of pilings or pads 14 embedded in the concentrator mounting surface 15 rigidly supports legs 9.

Lead screw 16 is attached at the midpoint of its upper support member 27 via electric drive motor and controller 18, which imparts rotational motion to screw 16 screwing it within hinged nut 17 connected to support structure 4 at a midpoint of horizontal member 21, thereby providing rotation about the elevational axis defined by a line passing through both hinges 7. The reflector end of screw 16 passes through a hole in reflector 47. Only one lead screw 16 is used rather than two as in prior art reflectors, to minimize binding problems.

Turret 6 is supported on base 46 by means of wheels 29 which are constrained to ride on a circular track (not shown) fabricated on the top of platform 8.

Legs 9 slant radially outwardly from top to bottom, thereby: (1) providing for a more secure mount than strictly vertical legs, and (2) allowing room for wheel 12 to be larger in diameter than circular bottom 30 of turret 6, thereby creating a mechanical advantage in the azimuth drive mechanism.

Figure 3:
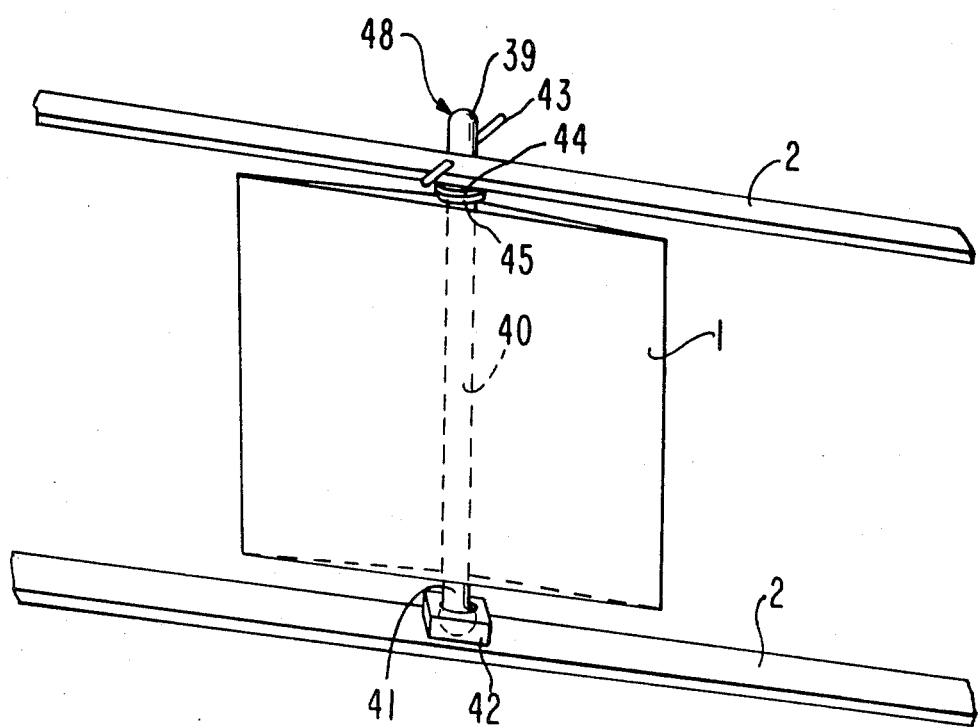
FIG. 3 is an elevational view of the apparatus used to mount one of the reflective panels (1)

FIG. 3 shows a reflective panel 1 mounted between two horizontal support beams 2. Each panel 1 can be partially pivoted about two orthogonal axes and locked in its focal position. During manufacture, all panels 1 in a module 3 can be installed and accurately adjusted in the factory by means of an alignment fixture using a light source such as a laser. Then the modules 3 are transported to the erection site.

By varying the length and number of support beams 2, various size reflecting surfaces can be obtained by mounting and combining a greater or lesser number of reflecting panels 1.

The projection of each panel 1 onto a plane (i.e., its aperture) is preferably a square. This gives reflector 47 a rectangular aperture. However, the periphery of each panel 1 may or may not be a square, depending upon the manufacturing technique employed.

FIG. 3 is oriented so that the radiation emanates from the lower left and moves towards the upper right of the drawing. A vertical axle 48 is connected between horizontal lead screw 43 and lower horizontal beam 2. Axle 48 permits partial rotation of panel 1 about a vertical axis coincident with axle 48. Axle 48 comprises two pieces which rotate with respect to each other: nonrotating upper piece 39 connected to lead screw 43, and rotating lower piece 40 fixedly attached to the back of panel 1. Pieces 39 and 40 are rotatably joined at flanges 44 and 45 which can be locked after alignment by means of bolts, pins or other suitable locking devices.

The bottom of piece 40 is a ball 41 fitting into a socket 42 fixedly mounted to lower horizontal beam 2. This ball and socket arrangement permits free movement of piece 40 at the lower horizontal beam 2 in the two rotational directions desired.

Rotation of panel 1 about the horizontal axis defined by lower horizontal beam 2 is obtained by means of changing the axial position of upper piece 39 along lead screw 43, and then locking it in place by means of a set screw or other suitable locking means. Lead screw 43 is fixedly mounted to upper horizontal beam 2. Typically, the rotation of any panel 1 in either the horizontal or the vertical axis does not need to exceed more than a few degrees, because of the bends in beams 2 and members 20.

Each panel 1 consists of a lightweight substrate shaped to the desired spherical radius. The substrate may be fabricated of sheetmetal or a honeycomb sandwich of such materials as aluminum or plastic. Thin silvered glass is mechanically deformed to match the concave face of the substrate and bonded thereto. Use of thin, high quality (low iron) glass provides low absorption and high reflectivity.

FIG. 4 shows a detailed view of reflector support structure 4. It consists of two vertical members 20 to which are mounted the horizontal beams 2; two horizontal members 21; and four diagonal members 22 for antitwist stabilization. Rectangular plate 52 is attached at the intersection of diagonal members 22 for additional strength. Plate 52 allows all four diagonal members 22 to lie in the same plane.

Receiver support struts 5 fit into blocks 23 mounted to vertical support members 20 at points readily accessible between modules 3.

Vertical support members 20 are thicker near their midpoints than near their ends because they must support greater loads towards their midpoints.

The following are some of the advantages provided by reflector 47 over the prior art:

Reflector 47 can have a height-to-width ratio other than 1:1, unlike conventional circular reflector apertures. For example, a reduced vertical height compared with horizontal width results in lower aerodynamic wind loading, thereby reducing wind overturning moments on turret 6. This makes it possible to have a lighter, less expensive turret 6 and base 46.

Reflector 47's surface area can be easily changed by varying the number of reflective panels 1. The number and length of beams 2 is varied depending upon the number of panels 1 to be mounted. This modularity makes it possible to match the reflective surface area to the solar insolation level received at each specific plant site, i.e., more panels 1 are used for sites having lower insolation levels. This permits the receiver and engine 34 to operate at or near their designed temperature ratings, thereby maximizing their efficiency, even when the solar plants are located in widely scattered geographical areas.

Panels 1 are not required to carry any structural support loads. They therefore need handle deflections due to gravity and wind loads only. This results in a lighter weight panel design which in turn reduces support structure 4 weight requirements. This results in reduced loads on bearings 10, 19, turret 6, and base 46. All of these factors result in a more economical structure than prior designs in which the reflective panels 1 were integral load carrying portions of the reflective support structure.

The openings between modules 3 and between panels 1 reduce wind surge loading from gusting and vortex formation. This permits lighter weight panels 1 and beams 2 and therefore a more economical reflector support structure 4.

Horizontal beams 2 are composed solely of straight sections. This is possible because support structure 4 does not need to conform to a precision paraboloidal or spherical shape, since each reflective panel 1 is individually aligned to reflect solar flux into the receiver aperture 36. The reflector support structure 4 is not composed of many pieces of different shapes as in prior concentrator designs.

Reflective panels 1 can be installed and aligned within modules 3 at the manufacturing plant where economical labor and equipment are available for mass production. This manufacturing approach minimizes the use of high cost assembly labor at the field site. All the beams 2 for a given reflector 47 size, as well as all panels 1, are identical in size and shape. This permits a lower investment in tooling and fixtures necessary to achieve the desired slope error.

The modularity of the design is also a benefit in maintaining and repairing the concentrator.

Figure 5:
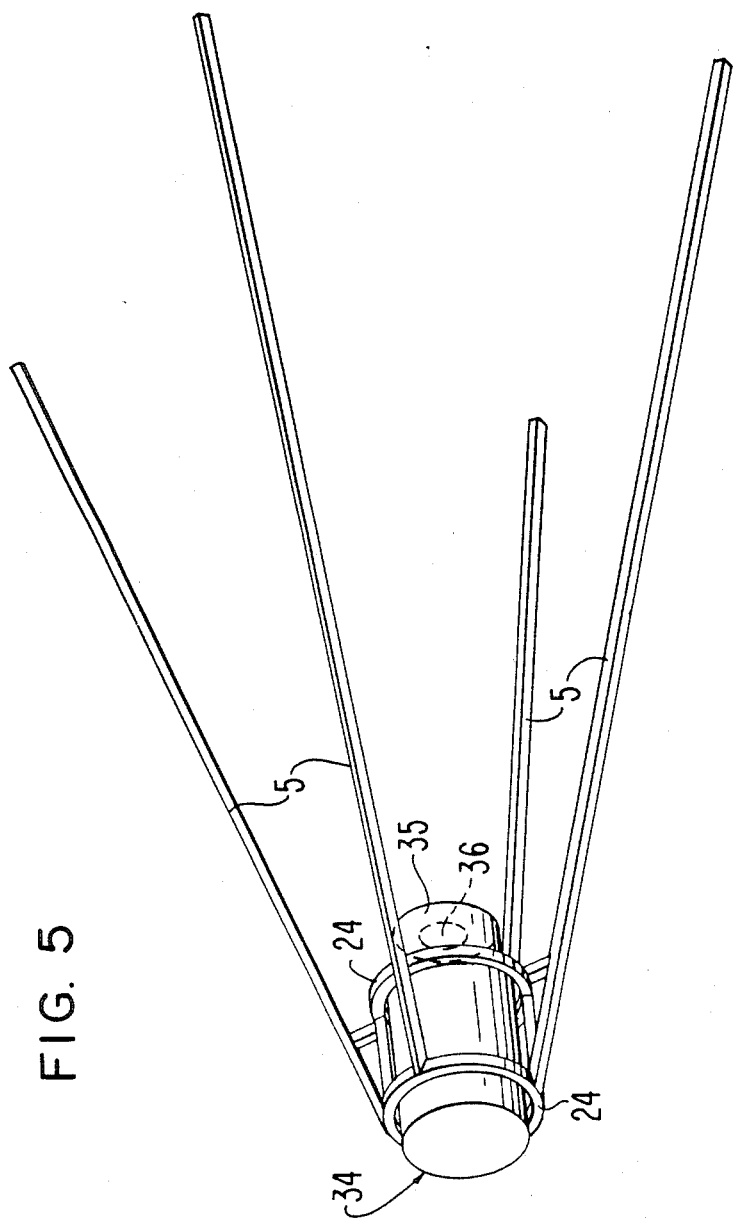
FIG. 5 is an elevational view of a typical solar receiver (34) and accompanying support struts (5) which may be used in the present invention.

FIG. 5 shows solar receiver 34 mounted on struts 5 by means of clamps, rings or other attachment means 24. The heat-resistant lip 35 of receiver 34 defines its aperture 36. A minimum of three struts 5 are recommended for reasons of safety. Four struts are preferable because then the bottom two struts 5 can be hinged at lower blocks 23 and the upper two struts 5 uncoupled at upper blocks 23 to enable easy maintenance on receiver 34 and other attached devices.

The receiver 34 support loads are coupled directly into reflector support structure 4; therefore, none of these loads are carried by horizontal beams 2. This allows a lighter weight and therefore more economical structural design for horizontal beams 2.

A heat engine, such as a Stirling or Rankine engine, plus alternator, can be situated next to receiver 34 or on mounting surface 15. Or, the end product of solar receiver 34 can be a heated fluid to provide industrial process heat.

The lower receiver support struts 5 tie directly into the reflector support structure 4 near elevation hinges 7. These lower struts 5 can be hollowed so as to enclose fluid pipes and/or electrical cables to and from receiver/engine 34. These pipes/cables are then routed through the interior of torque tube 11. Struts 5 and tube 11 are then externally heat insulated. This creates a thermally efficient low cost fluid/electricity path from receiver 34 to mounting surface 15.

Figure 6:
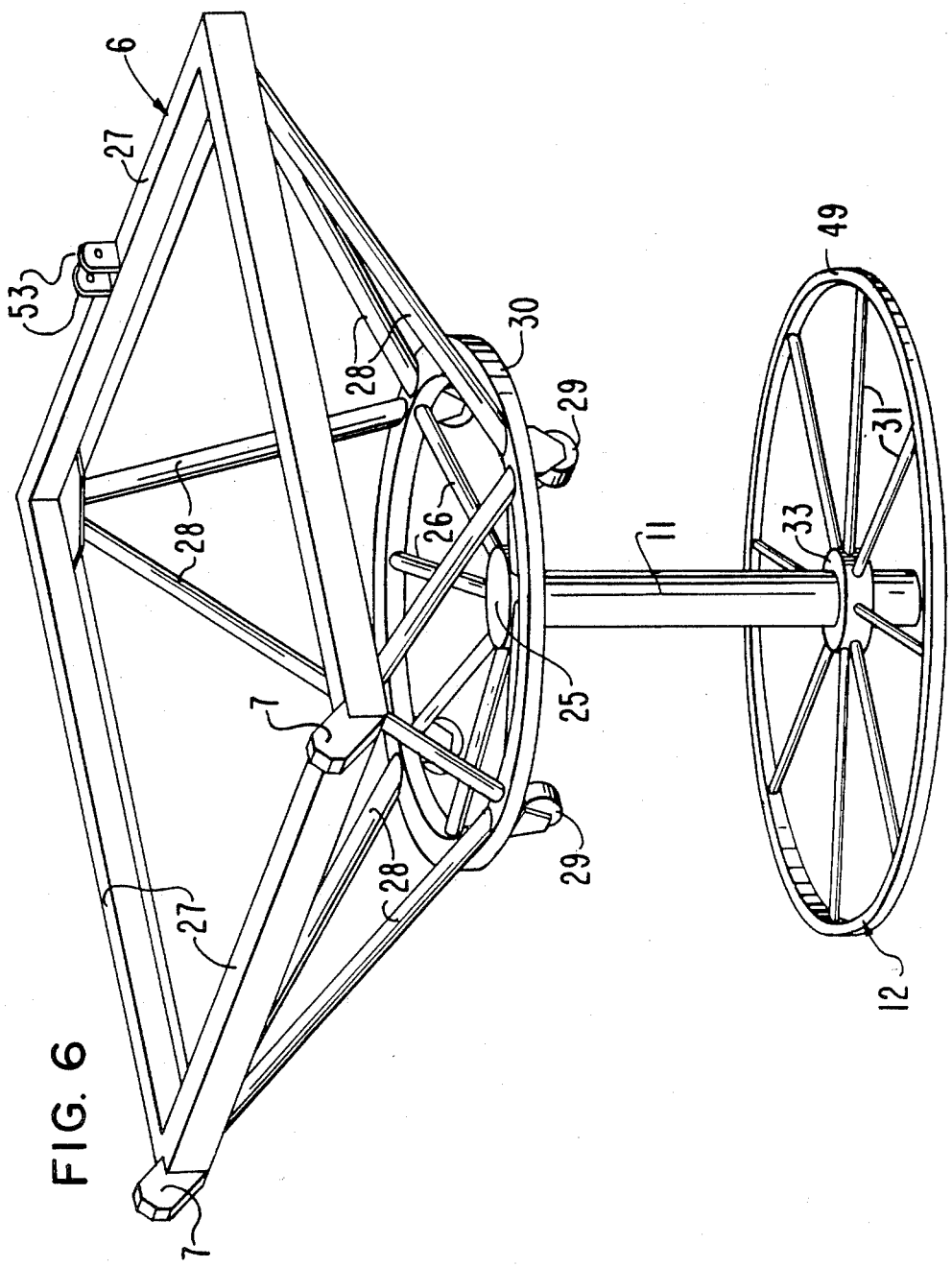
FIG. 6 is an elevational view of the rotary turret (6) portion of the present invention.

FIG. 6 illustrates details of rotary turret 6. The top of vertical torque tube 11 is connected to the circular bottom 30 of turret 6 by means of a circular collar 25 (positioned somewhat below bottom 30 for maximum strength) and a set of spokes 26. The radially inward slant (from top to bottom) of the upper portion of turret 6 (resembling an inverted pyramid) makes for a lighter structure than a non-pyramidal design; furthermore, this technique allows platform 8 to be smaller and lighter. Bottom 30 is connected to upper members 27 of turret 6 by means of two diagonal members 28 for each upper member 27. The number and placement of upper members 27 normally coincides with the number and placement of corresponding members on reflector support structure 4, in this case four, so that reflector 47 rests evenly on turret 6 when reflector 47 is pointing straight up.

Turret 6 mounts on top of horizontal platform 8 of base 46 by means of rotating wheels 29 rigidly mounted to the underside of bottom 30. Typically, there is one wheel 29 for each upper member 27, positioned midway between the ends of its corresponding upper member 27 and situated directly beneath the two diagonal members 28 which support that upper member 27.

The azimuth drive wheel 12 consists of inner collar 33 and outer rim 49 connected together by means of several spokes 31.

Tangs 53 protrude from the top of that upper member 27 opposite from hinges 7, for purposes of pivotally accommodating motor/controller 18.

Figure 7:
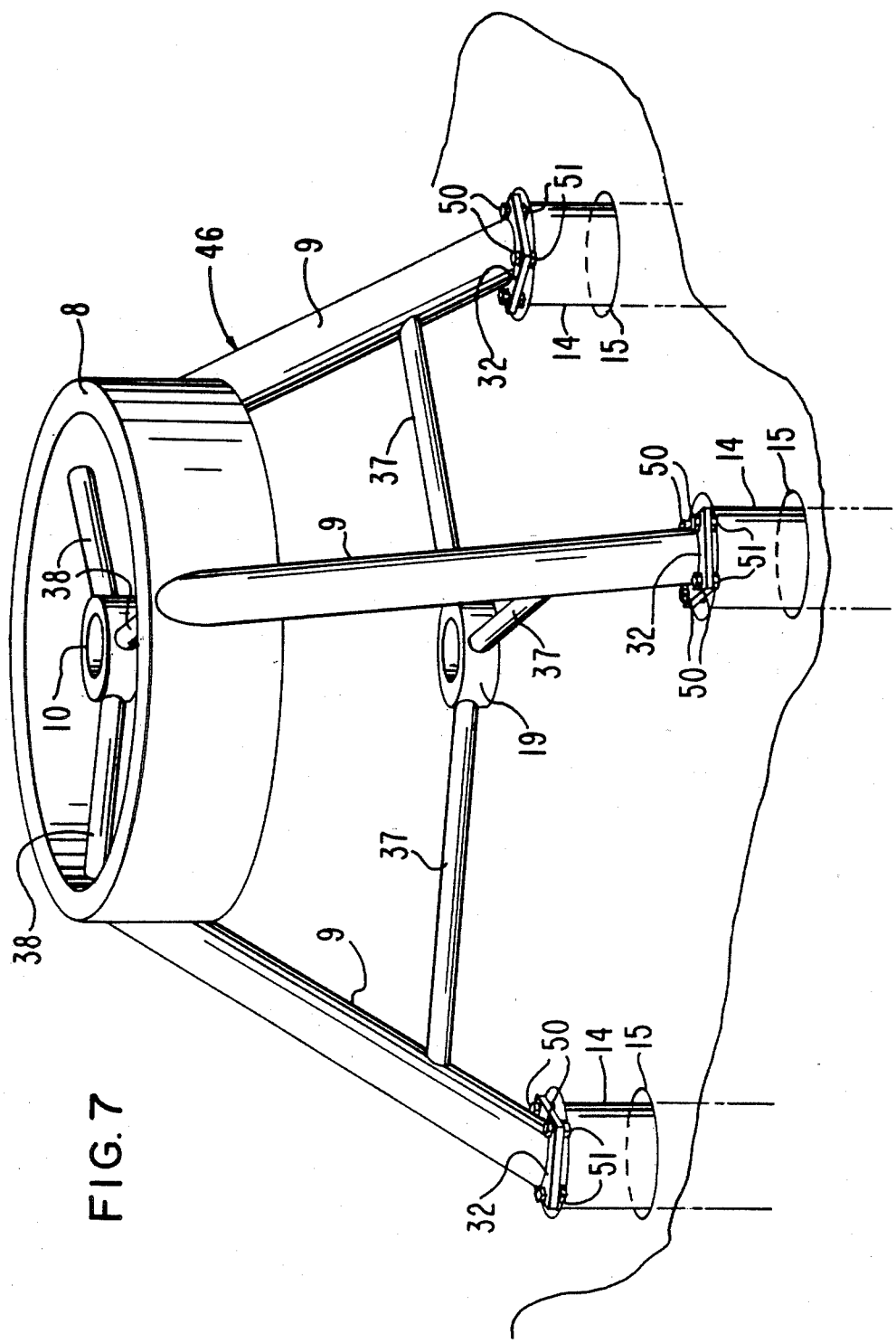
FIG. 7 is an elevational view of the base (46) of the present invention.

FIG. 7 shows the details of base 46. Horizontal member 8 supports wheels 29 constrained to ride on a track (not shown) fabricated into the top of horizontal platform 8. Upper hub/bearing 10 and lower hub/bearing 19 are dimensioned to slidably constrain torque tube 11. Upper hub/bearing 10 is radially supported from platform 8 by means of spokes 38; lower hub/bearing 19 is radially supported from legs 9 by means of spokes 37. Legs 9 terminate in attachment flanges 32 which attach to foundation pilings or pads 14 by means of bolts or other mounting devices 50 protruding from pads 14. Mounting surface 15 does not have to be level; rather, the heights of pilings 14 can vary. Base 46 can be leveled by means of leveling nuts 51 which thread about mounting bolts 50 underneath flanges 32.

Three is a minimum number of legs 9 that can achieve a stable mount. More can be used but this might be unnecessarily expensive since the costs of pads 14, which typically involve pouring concrete, are high; simplicity and ease of installation are major objects of this invention. Legs 9 flare radially outwardly from top to bottom to provide increased structural support and to provide room for a large azimuth drive wheel 12 so as to yield as great a mechanical advantage as possible. Thus, base 46 has substantially the shape of a pyramid.

A major advantage of this mount is that the paths for gravity and overturning loads are decoupled. Gravity loads flow directly from turret frame 27, 28 through wheels 29 into mount legs 9 and foundations 14. Wind induced and other overturning loads are coupled into turret frame 27, 28 and reacted into mount legs 9 through stiff torque tube 11 and hub supports 10, 19. The use of an expensive precision bull gear subject to both gravity and overturning loads is thus avoided.

Azimuth/elevation mount 6, 46 can be used for supporting any structure requiring this type of mount, e.g., microwave antennas, telescopes, etc.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Method for mass producing a solar radiation reflector comprising the steps of:
    mass producing many identical reflective facets each having the contour of a portion of a sphere;
    mounting a row of said facets between two horizontal parallel beams such that each facet can partially rotate about a vertical axis and can partially rotate about a horizontal axis;
    assembling at least one module comprising at least two horizontal beams fixedly positioned with respect to each other;
    mounting the modules onto a test fixture;
    aligning all of the facets so that they focus radiation from a distant point upon an aperture a distance from each facet equal to one half the radius of curvature of each facet;
    removing the modules from the test fixture;
    transporting the modules to the site where the concentrator is located; and
    affixing the modules onto a reflector support structure so as to make a prefocused solar radiation reflector.

2. A method for constructing an aligned point focusing solar radiation concentrator at a remote location, comprising the steps of:
    mass producing many reflective panels each having uniform size and shape, and each having a reflective surface area which is a portion of a sphere;

combining sets of the reflective panels into modules, wherein each module comprises at least two identical piecewise-straight parallel beams and several panels, each panel being mounted within a pair of beams each panel can partially rotate about a vertical axis and can partially rotate about a horizontal axis;

attaching at least one module onto a brace to form a reflector having a small focal aperture substantially R/2 away from each panel, where R is the radius of curvature of each panel;

aligning the panels to maximize the degree to which they reflect solar radiation onto the focal aperture;

removing the modules from the brace whilst preserving the alignment accomplished by the preceding step;

moving the aligned modules and brace to the remote location; and reassembling the aligned modules onto the brace at the remote location.

* * * * *